United States Patent [19]

Weinbaum et al.

[11] 3,714,782
[45] Feb. 6, 1973

[54] GASEOUS NUCLEAR ROCKET ENGINE

[75] Inventors: Sheldon Weinbaum, New York, N.Y.; Robert T. Liner, Jr., Devon, Pa.

[73] Assignee: General Electric Company

[22] Filed: April 15, 1969

[21] Appl. No.: 816,269

[52] U.S. Cl. ..................................60/203, 176/39
[51] Int. Cl. ..............................................G21d 5/02
[58] Field of Search ..........................176/39; 60/203

[56] References Cited

UNITED STATES PATENTS 3,270,496   9/1966   Rom .......................................60/203
3,399,534   9/1968   Hunter et al. .........................60/203

*Primary Examiner*—Reuben Epstein
*Attorney*—Allen E. Amgott, Raymond H. Quist, Henry W. Kaufmann and Oscar B. Waddell

[57] ABSTRACT

A gaseous nuclear propulsion engine wherein cool propellant gas is introduced around the nozzle at the aft end of the chamber and caused to flow along the chamber's outer wall to the chamber's fore end where it is deflected into a converging annular stream flowing toward the nozzle at the center of the chamber's aft end. Fissionable fuel gas is injected at the center of the fore end and is trapped in a closed space surrounded by the converging annularly flowing propellant gas. The fuel gas is maintained at a very high temperature by nuclear fission. Thermal radiation from the hot fuel gas is absorbed in the propellant gas as it flows toward the nozzle, thus heating the propellant to a high temperature before it exits through the nozzle.

1 Claim, 1 Drawing Figure

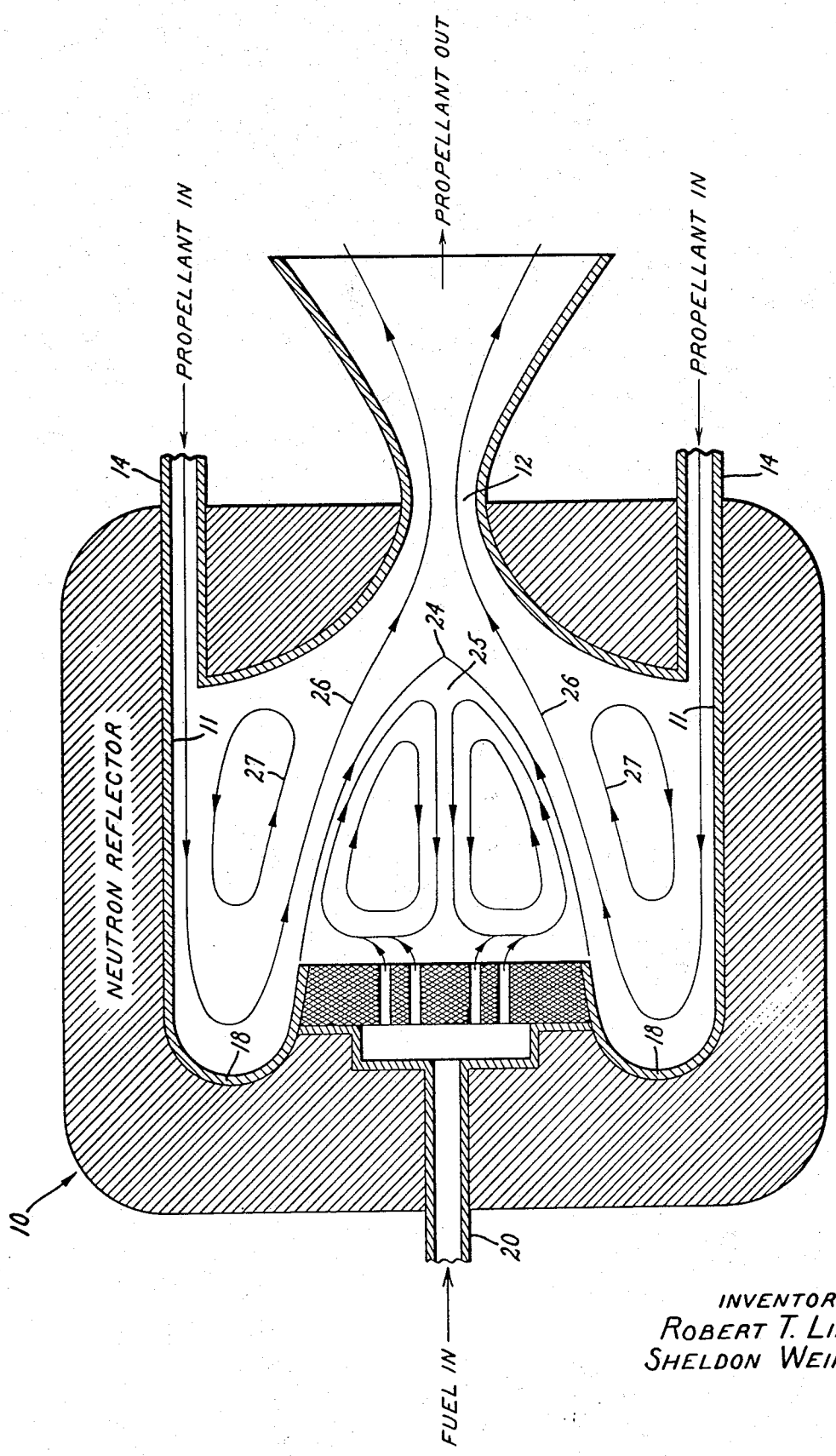

3,714,782

GASEOUS NUCLEAR ROCKET ENGINE

INTRODUCTION

This invention pertains to a gaseous nuclear propulsion engine and more specifically to a containment-reaction chamber for enhancing the performance of such engines.

BACKGROUND OF THE INVENTION

In gaseous nuclear propulsion engines a neutron fission chain reaction in a gaseous medium supplies the energy for heating a light propellant gas which is subsequently ejected through a nozzle to produce thrust. Economic and safety considerations dictate that loss of the radioactive fuel gas in such engines be minimized. In gaseous nuclear propulsion engines heretofore proposed, a substantial amount of fuel gas is lost by being swept out of the chamber with the propellant gas.

Generally, the object of the present invention is to provide an improved chamber for a gaseous nuclear propulsion engine wherein fuel gas is conserved and the propellant gas is heated to a high temperature with a high degree of thermal efficiency.

BRIEF DESCRIPTION OF THE INVENTION

This and other objects are met, in accordance with the present invention, by a cylindrical containment-reaction chamber for gaseous nuclear propulsion engines with an injection means for causing a light propellant gas to enter the chamber near its aft end and to travel, along the outer wall of the chamber, from the nozzle or aft end to the forward end where it is deflected into a converging stream flowing in the axial direction through the cylindrical chamber toward the nozzle at the center of the aft end thereof. Convergence occurs just short of the nozzle. Heavy fissionable fuel gas is injected at the center of the fore end of the chamber where it is trapped in the generally conical space surrounded by the converging propellant gas stream. Convective loss of fuel gas from the chamber is thus minimized. At the same time the propellant gas, in its passage from the aft to the fore end of the reactor, insulates the hot core of the reactor from the reactor walls while it is preheated by the reverse flowing converging propellant gas stream.

DETAILED DESCRIPTION OF THE INVENTION

While the specification concludes with claims particularly pointing out and distinctly claiming the subject matter of the present invention, this invention may be better understood from the following description, taken in conjunction with the FIGURE, which is a schematic cross sectional view of the gaseous nuclear propulsion engine containment-reaction chamber of the present invention.

Referring more specifically to the FIGURE there is shown cylindrical containment-reaction chamber 10 with side wall 11, and nozzle 12. Propellant gas injection means 14 is disposed about nozzle 12 at the aft end of chamber 10. At the fore end of the chamber 10 is annular deflecting means 18 and fuel gas inlet 20. Deflecting means 18 reverses the flow of the propellant gas and produces a generally convergent stream of propellant gas, annular in cross section, flowing in the axial direction through the cylindrical chamber 10. This reverse flowing stream converges at a point 24 short of the throat of nozzle 12 to form a generally conical enclosed space 25, in which fuel gas, introduced through inlet 20, is trapped, minimizing convective fuel gas loss. Closed circulating flows of propellant gas 27 are thought to contribute further to the desirable fluid dynamics in chamber 10.

In operation, an incoming flow of propellant gas, such as hydrogen, passes along the outer walls of chamber 10 and is deflected by deflector 18 into a relatively low velocity reverse flowing stream which converges toward the axis of chamber 10 near the throat of nozzle 12, as generally indicated by flow lines 26 trapping fissionable fuel gas, such as uranium hexafluoride, introduced through inlet 20 in the enclosed space 25. The incoming propellant gas, which is relatively cool, is preheated by reverse flowing propellant gas. Propellant gas inlets and deflector 18 are designed so that the velocity of propellant gas coming into contact with fuel gas near fuel gas inlet 20 is relatively low. This, combined with the relatively low velocity of fuel gas entering the enclosed space 25 in chamber 10 through inlet 20, minimizes momentum transfer between the propellant and fuel gas streams thereby contributing to the minimization of convective fuel gas loss. Propellant gas, heated further by thermal radiation as it converges about the enclosed hot fuel gas in conical space 25, finally exits the chamber 10 at nozzle 12 producing thrust on the unit.

Because no chamber components, other than nozzle 12, need be in contact with the propellant gas as it approaches its exit temperature, many problems associated with maintaining wall temperature below the material melting point are eliminated. More importantly, a minimum amount of fuel gas, which is both expensive and hazardous, is swept out of the chamber with the propellant gas, while the propellant gas is heated by the thermal radiation from the fuel gas with a high degree of efficiency.

Other design modifications within the scope of the present invention include, for example, means for injecting the propellant gas into the chamber with a tangential velocity component to produce some degree of "swirl" about the core of the chamber, suction ports to ensure that most of the propellant gas reaches the forward end of the chamber before being deflected toward the chamber axis, and means for suppressing turbulence or otherwise improving the fluid dynamics of the containment-reaction chamber.

What we claim as new and desire to secure by Letters Patent of the United States is:

1. A cylindrical containment-reaction chamber for a gaseous nuclear propulsion engine comprising
   a. means for injecting into said chamber, at said chamber's aft end, a light propellant gas and for causing said incoming propellant gas to travel along the side wall of said chamber toward the forward end thereof;
   b. annular means for deflecting said propellant gas at the fore end of said chamber into a converging stream, annular in cross-section, flowing toward a nozzle centrally located at the aft end of said chamber; and causing said converging stream to converge at a point short of the aft end of said chamber; and c. means for injecting a fissionable heavy fuel gas into said chamber at the center of the fore end thereof.

* * * * *